US007215414B2

(12) United States Patent
Ross

(10) Patent No.: US 7,215,414 B2
(45) Date of Patent: May 8, 2007

(54) MODULE FOR VALIDATING DEPOSITED MEDIA ITEMS

(75) Inventor: Gary A. Ross, Fife (GB)

(73) Assignee: NCR Corporation, Dayton, OH (US)

( * ) Notice: Subject to any disclaimer, the term of this patent is extended or adjusted under 35 U.S.C. 154(b) by 298 days.

(21) Appl. No.: 10/739,506

(22) Filed: Dec. 18, 2003

(65) Prior Publication Data

US 2004/0169846 A1 Sep. 2, 2004

(30) Foreign Application Priority Data

Feb. 27, 2003 (GB) ................................ 0304402.1

(51) Int. Cl.
*G06K 9/74* (2006.01)

(52) U.S. Cl. ........................................................ 356/71

(58) Field of Classification Search .................. 356/71
See application file for complete search history.

(56) References Cited

U.S. PATENT DOCUMENTS 6,734,953 B2 * 5/2004 Numata ....................... 356/71
6,785,405 B2 * 8/2004 Tuttle et al. ................ 382/112

FOREIGN PATENT DOCUMENTS

| | | |
|---|---|---|
| EP | 0 537 513 A1 | 4/1993 |
| GB | 2 107 911 A | 5/1983 |
| GB | 2 341 263 A | 3/2000 |
| GB | 2 345 181 A | 6/2000 |
| GB | 2 347 000 A | 8/2000 |
| WO | WO 97/46982 | 12/1997 |

* cited by examiner

*Primary Examiner*—Gregory J. Toatley, Jr.
*Assistant Examiner*—Amanda Merlino
(74) *Attorney, Agent, or Firm*—Priest & Goldstein PLLC

(57) ABSTRACT

A module (10) for validating deposited media items is described. The module comprises: illuminating means (24) for illuminating a deposited media item (20); directing means (34) for directing illuminations from the illuminating means (24) to an examination area (22); optical detecting means (26) for detecting emissions from the deposited media item (20) at the examination area (22), where the emissions are caused by the illuminations; and processing means (32) for processing the detected emissions. The processing means (32) is operable in either a first mode, in which the deposited media type is known, or in a second mode, in which the deposited media type is not known. The illuminating means (24) includes ultra-violet radiation, infra-red radiation, and discrete primary colors.

4 Claims, 3 Drawing Sheets

MODULE FOR VALIDATING DEPOSITED MEDIA ITEMS

BACKGROUND OF THE INVENTION

The present invention relates to a module for validating media items. In particular, the invention relates to a module for validating different types of deposited valuable media items, for example banknotes, tickets, cheques, and such like. The invention also relates to a self-service terminal, such as an automated teller machine (ATM), including such a media validating module.

Many ATMs include one or more depository modules for receiving and validating valuable media items. For example, an ATM may include:

(i.) a cheque depository module that receives and validates cheques input by a user, and (ii.) a note depository module that receives and validates banknotes input by a user.

Each depository module includes various elements, for example: a slot for receiving a media item, an imaging device for imaging an inserted media item, sensors for detecting the position of an inserted media item, a processing engine for validating an inserted media item, an interface for coupling the module to a self-service terminal to allow transfer of data, and such like.

Providing a depository module for each type of media item to be validated is both expensive and an inefficient use of space because similar elements are included in each depository module. However, different types of media require different validation tests to be performed. These different tests involve different illumination sources, different image resolutions, and such like.

SUMMARY OF THE INVENTION

It is among the objects of one or more embodiments of the present invention to obviate or mitigate the above disadvantages or other disadvantages associated with prior art media validating modules.

According to a first aspect of the present invention there is provided a module for validating deposited media items, the module comprising: illuminating means for illuminating a deposited media item with ultra-violet radiation, infra-red radiation, and discrete primary colours; directing means for directing illuminations from the illuminating means to an examination area; optical detecting means for detecting emissions from the deposited media item at the examination area, where the emissions are caused by the illuminations; and processing means for processing the detected emissions; wherein the processing means is operable in either a first mode, in which the deposited media type is known, or in a second mode, in which the deposited media type is not known.

Preferably, the module includes conveying means for conveying the deposited media item through the examination area.

Preferably, the discrete primary colours comprise additive primary colours (red, green, blue). Alternatively, and less preferably, the discrete primary colours comprise first subtractive primary colours (red, yellow, blue), or second subtractive primary colours (magenta, yellow, cyan).

Preferably, the illuminating means is in the form of a plurality of sequentially activatable radiation sources.

In a preferred embodiment, the radiation sources are light emitting diodes (LEDs). Each type of radiation source (for example, UV light, IR light, and such like) may comprise a plurality of source elements. For example, there may be six UV light elements, six IR light elements, four red light elements, four green light elements, and four blue light elements.

In some embodiments, the illuminating means may comprise radiation sources disposed on opposing sides of a media item, so that reflection and transmission information may be captured. Transmission information may be useful in detecting security features such as: threads, watermarks, registration marks, and such like.

In some embodiments, the illuminating means may comprise radiation sources disposed on only one side of the media item so that only reflection information or only transmission information is captured.

Preferably, the examination area extends across an entire width of a deposited media item, so that the entire width of each deposited media item is illuminated.

The directing means may be implemented by focusing optics. Alternatively, the directing means may be implemented by a housing for maintaining the illuminating means in a pre-determined configuration so that the illuminating means are permanently directed to the examination area.

Where focusing optics are used, the optics may be provided by one or more lenses, and/or prisms, and/or mirrors, and/or light guides.

The optical detecting means may be implemented by a charge-coupled device (CCD) detector, a CMOS linear image sensor, a contact image sensor (CIS) detector, a linear photodiode detector, or such like. In a preferred embodiment, a CIS module is used so that the module is relatively small in size and can be located in close proximity to a media item in the examination area.

The term “validating” is used herein in a generic sense and includes one or more of the concepts of recognising, authenticating, ratifying, and such like.

The word “media” is used herein in a generic sense to denote one or more items, documents, or such like having a generally laminar sheet form; in particular, the word “media” when used herein does not necessarily relate exclusively to multiple items or documents. Thus, the word “media” may be used to refer to a single item (rather than using the word “medium”) and/or to multiple items.

According to a second aspect of the present invention there is provided a method of validating deposited media items, the method comprising the steps of: conveying a received media item to an examination area extending across the media item; illuminating the media item by sequentially activating an ultra-violet radiation source, an infra-red radiation source, and three discrete primary colour sources, so that a portion of the media item in the examination area is illuminated by the ultra-violet radiation alone, by the infra-red radiation alone, and by the three primary colours alone; detecting emissions from the deposited media item at the examination area, where the emissions are caused by the illumination sources; collating the detected emissions according to the type of source used; and processing the collated emissions to validate the media item.

The three primary colour sources may be activated sequentially so that one colour source is activated at a time, for example, a red source may be activated, then a green source, then a blue source; alternatively, the three colour sources may be activated simultaneously (that is, the sources may be activated as if the three primary colour sources were a single source of white light) so that white light is produced.

According to a third aspect of the present invention there is provided a method of validating deposited media items, the method comprising the steps of: receiving a media item to be validated; ascertaining if the media item is of a known type; if the media item is of a known type, applying a media-specific illumination scheme to the media item, where the media-specific illumination scheme activates only those illumination sources required for validating that media type; if the media item is not of a known type, applying a non-media-specific illumination scheme to the media item; detecting emissions from the media item, where the emissions are caused by the activated illumination sources; collating the detected emissions according to the type of source used; and processing the collated emissions to validate the media item.

The media-specific illumination scheme preferably includes a sequence in which illumination sources are activated, if more than one source is required. For example, if a cheque is to be validated, then a cheque illumination scheme is used, which may use only the three primary colour sources so that white light is produced to image text on the cheque. If a ticket is to be validated, then a ticket illumination scheme is used, which may use an ultra-violet radiation source and the three primary colour sources to detect text on the ticket (using the three primary colours) and a fluorescent image (using the ultra-violet radiation source). If a banknote is to be validated to authenticate the banknote, then a banknote authentication illumination scheme is used, which may use all of the illumination sources. If a banknote is to be validated merely to recognise the banknote, then a banknote recognition illumination scheme is used, which may use only one of the three primary colour illumination sources.

Where the non-media-specific illumination scheme is used, the step of processing the collated emissions to validate the media item may include the sub-steps of identifying the type of media item, then authenticating the identified media item.

The non-media-specific illumination scheme may activate only one light source, or only the primary colour sources. The method may include the steps of: (i.) determining the type of media item and the media-specific illumination scheme to be used; (ii.) reversing transport of the media item; and (iii.) applying the media-specific illumination scheme (when the media item is moving in a forward direction and/or in a reverse direction) to authenticate the media item. These steps have the advantage that a rapid recognition step may be performed to ascertain the media type prior to performing a media-specific illumination scheme.

Alternatively, the non-media-specific scheme may activate every illumination source that is required for validating at least one media type. However, this may take longer than implementing a simple recognition scheme followed by a media-specific scheme.

The illumination schemes may specify additional requirements, for example, the line capture rate (which influences the resolution of a final image). The line capture rate may vary for different parts of the media item.

According to a fourth aspect of the present invention there is provided a self-service terminal including the module for validating deposited media items according to the first aspect of the invention. One or more parts of the module may be distributed throughout the SST; for example, the processing means may be implemented by SST processing means.

It will now be apparent that the above aspects of the present invention have the advantage that a media validation module may be used to validate many different types of media, thereby avoiding the need for multiple media validation modules. The media validation module has the further advantage that it is not necessary to know what type of media item is being validated prior to initiation of the validation process. Another advantage is that a user interface can be simplified as only one entrance port (such as a slot) is required.

By capturing emissions (reflections or transmissions) from a media item line by line and source by source, an image of the media item can be constructed for each source, thereby providing rich emission information which can be analysed to recognise and/or authenticate a media item.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
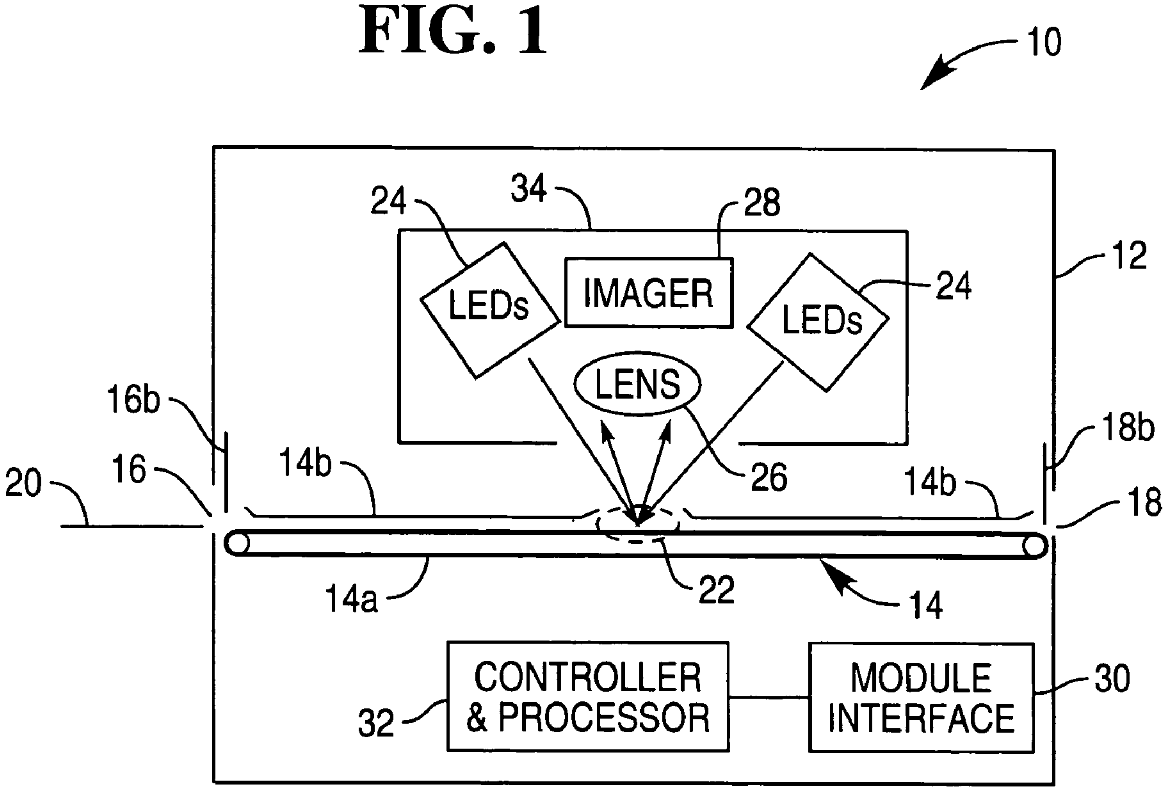
FIG. 1 is a schematic diagram of a media validation module according to one embodiment of the present invention.

Reference is first made to FIG. 1, which is a schematic diagram of a media validation module 10 according to one embodiment of the present invention.

The module 10 has a module housing 12 supporting conveying means 14 in the form of two skid plates 14*a*, and stretchable endless belts 14*b* extending from an entrance port 16 to a capture port 18.

The entrance port 16 is in the form of an aperture defined by the housing 12, and that is opened or closed by an entrance shutter 16*b* movably mounted in the housing 12. Similarly, the capture port 18 is also in the form of an aperture defined by the housing 12, and that is opened or closed by a capture shutter 18*b* movably mounted in the housing 12. Media access to the module 10 is denied when both the entrance and capture shutters 16*b*, 18*b* are closed.

In use, the skid plates 14*a* and belts 14*b* guide a media item 20 through an examination area 22 defined by a gap between the two skid plates 14*a*, and at which the media item 20 is illuminated by illuminating means 24. Emissions from the media item 20 are focused by an optical lens 26 and are detected by optical detecting means 28.

The module 10 includes a data and power interface 30 for allowing the module 10 to transfer data to an external unit, and to receive data and power from an external unit.

The module 10 also includes controlling and processing means 32 (in the form of a micro-controller) for controlling the endless belts 14*b*, the entrance shutter 16*b*, the capture shutter 18*b*, the illuminating means 24 and the detecting means 28. The micro-controller 32 also collates and processes data captured by the optical detecting means 28, and communicates this data and/or results of any analysis of this data to an external unit.

Directing means 34, in the form of an illumination housing, maintains the optical lens 26, the detecting means 28, and the illuminating means 24 in a pre-determined fixed position relative to the examination area 22.

Figure 2:
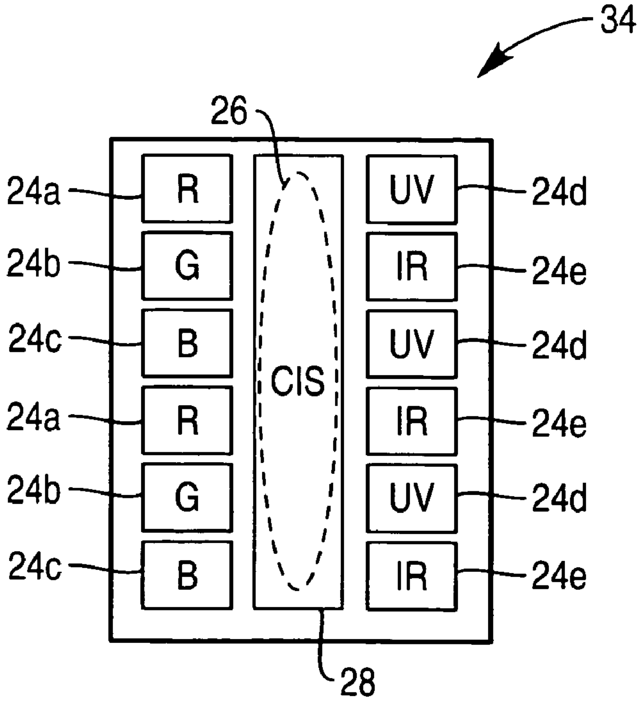
FIG. 2 is a schematic plan diagram of part of the module (the illumination housing) of FIG. 1.

Reference is now also made to FIG. 2, which is a schematic plan diagram of the illumination housing 34, showing parts of the illumination housing 34 in more detail.

The illuminating means 24 comprise a plurality of radiation sources. In this embodiment, the radiation sources are: a red light source 24*a*, a green light source 24*b*, and a blue light source 24*c*, a UV light source 24*d*, and an IR light source 24*e*. Each radiation source comprises a plurality of LED elements.

The three primary colour sources (red LED 24*a*, green LED 24*b*, and blue LED 24*c*) can be activated simultaneously to produce white light or individually to produce one of the primary colours. When the three primary colour sources are activated simultaneously, they will be referred to as a white light source.

The optical detecting means 28 is in the form of a CIS (contact image sensor) detector. A suitable CIS detector is available from Peripheral Imaging Corporation, 68 Bonaventura Drive, San Jose, Calif. 95134; one example of a suitable CIS chip is the PI3004 CIS chip having a resolution of 200 dpi, although other commercial CIS detectors would be suitable.

The red, green, and blue light sources (24*a,b,c*) are located on one side of the CIS detector 28, and the UV and IR light sources (24*d,e*) are located on the opposite side of the CIS detector 28. The individual red, green, and blue LED elements are arranged in a row so that a green element is always located between a red element and a blue element; similarly, the individual UV and IR LED elements are arranged alternately in a row.

The LED elements are mounted on the illumination housing 34 at an angle so that the LEDs are directed towards the examination area 22, and emissions from a portion of the media item 20 at the examination area 22 are reflected back to the CIS detector 28. For clarity, only twelve LED elements are shown in FIG. 2, but in practice, many more LED elements may be present.

Figure 3:
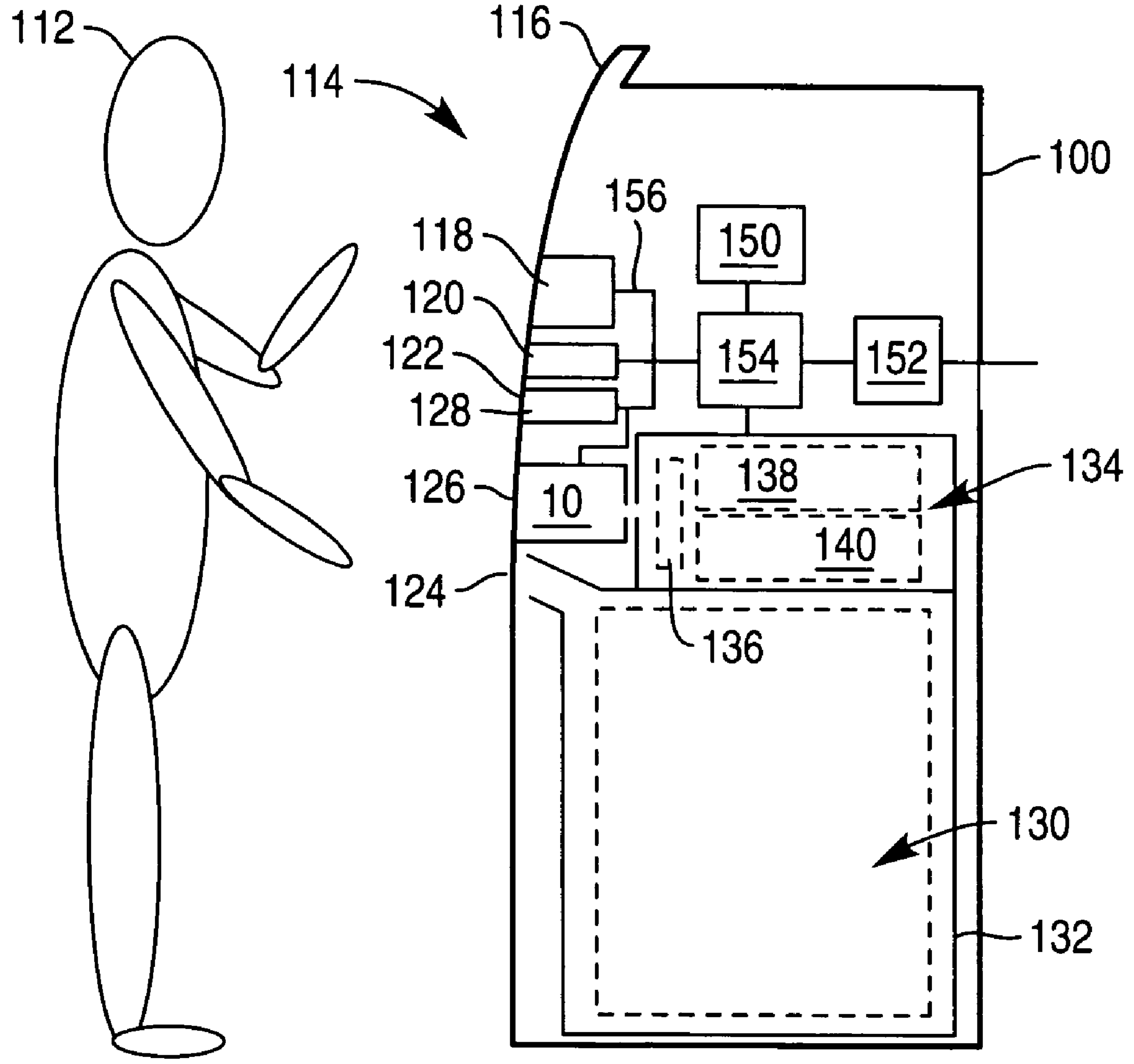
FIG. 3 is a schematic diagram of a self-service terminal (in the form of an ATM) including the module of FIG. 1.

Reference is now also made to FIG. 3, which shows an ATM 100 incorporating the validation module 10.

ATM 100 includes a user interface 114 for outputting information and media to a user 112 and for allowing the user 112 to input information and media to the ATM 100.

The user interface 114 is provided by a pivotably mounted moulded fascia 116, and comprises a display module 118, an encrypting keypad module 120, a card slot 122 defined by the fascia 116, a cash delivery slot 124 defined by the fascia 116, and a common deposit slot 126 defined by the fascia 116.

The card slot 122 aligns with a motorised card reader module 128 mounted within the ATM 100, the cash delivery slot 124 aligns with a cash dispense module 130 mounted in a safe 132 within the ATM 100, and the common deposit slot 126 aligns with the validation module 10 mounted within the ATM 100.

The validation module 10 is aligned with a deposit storage area 134 housed within an upper portion of the safe 132. The capture port 18 in the validation module 10 is in registration with a transport device 136 for transporting deposited media items to a cash receptacle 138 or a non-cash receptacle 140 located within the upper portion of the safe 132.

The ATM 100 also includes: an internal journal printer module 150 for recording all transactions executed by the ATM 100, a communication module 152 in the form of a network card for communicating with a remote transaction host (not shown) that authorises transactions, and an ATM controller 154.

The ATM controller 154 controls the operation of the modules within the ATM 100. An internal bus 156 securely conveys data and interconnects all of the modules within the ATM 100.

The operation of the module 10 will now be described, with reference to FIGS. 1 to 3, and also FIGS. 4*a* to 4*e*. FIGS. 4*a* to 4*e* are simplified schematic diagrams of a media item 20 at an examination area 22 within the module 10 of FIG. 1, and illustrate the media item at different positions relative to the examination area 22.

For the purpose of clarity, in FIGS. 4*a* to 4*e* the radiation sources 24 are shown in an arc formation; however, in this embodiment, the radiation sources are actually located on two parallel rows, as illustrated in FIG. 2.

When a media item 20 is inserted through the entrance port 16 (for example, by the user 112 inserting the media item 20 through the common deposit slot 126 during an ATM transaction), the conveying means 14 transports the media item to the examination area 22.

A validation procedure is then performed. The type of validation procedure performed depends on whether the type of media item being validated is known prior to validation or not. Examples of different media types will now be given.

EXAMPLE A

Unknown Media Type, Single Scan

If the media item is not of a known type, as in this example, then a non-media-specific illumination scheme is implemented.

In this example, the non-media-specific illumination scheme involves a single scan in which the module 10 illuminates the media item 20 with each of the radiation sources 24 in sequence while slowly advancing the media item 20 using the conveying means 14.

In implementing this non-media-specific illumination scheme, the conveying means 14 rapidly moves the media item 20 until a leading edge of the media item 20 approaches or enters the examination area 22. This may be detected using one of the radiation sources 24 as a position sensor.

When the leading edge of the media item 20 is detected at the examination area 22, the micro-controller 32 sequentially activates the radiation sources 24 while slowly moving the media item 20 through the examination area 22. In this embodiment, the micro-controller 32 typically moves the media item at a speed of approximately fifty centimetres per second (50 $cms^{-1}$) while the media item 20 is at the examination area 22; although other convenient speeds may be used.

Figure 4C:
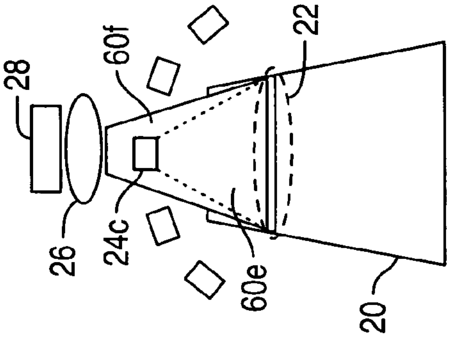
FIGS. 4*a* to 4*e* are simplified schematic diagrams of a media item at an examination area within the module of FIG. 1, the diagrams illustrate the media item at different positions relative to the examination area.
Figure 4B:
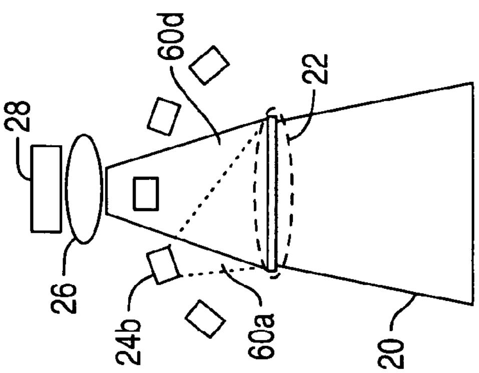
Figure 4A:
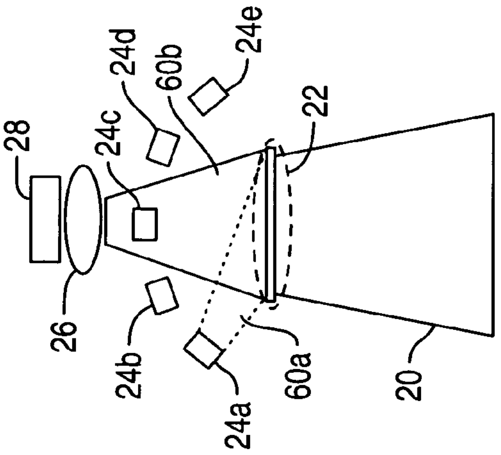
Figure 4E:
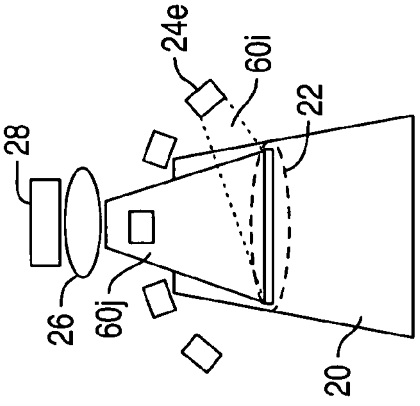
Figure 4D:
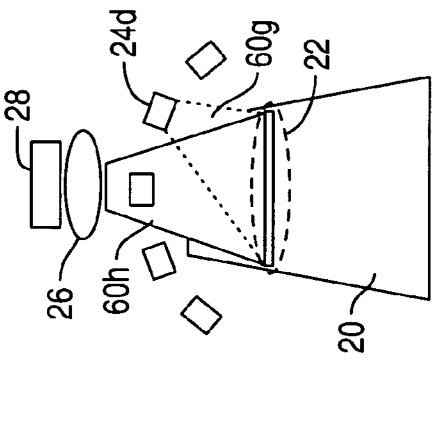

In this example, the red radiation source 24*a* is activated first, for a period of 250 microseconds (250ì s), when the leading edge of the media item 20 enters the examination area 22 (at time "t"), as illustrated in FIG. 4*a*. The radiated red light is indicated by numeral 60*a*, and the emission from the media item 20 caused by the radiated red light is indicated by numeral 60*b*. Emission 60*b* principally comprises reflections from the media item 20 at the examination area 22. The emission 60*b* is focused by the lens 26 and captured by the detector 28 as part of a red light image.

The red source 24*a* is then de-activated and the green source 24*b* is activated for 250ì s at time "t+250ì s". The green source 24*b* radiates green light 60*c* causing emission 60*d* from the media item 20. The emission 60*d* is focused by lens 26 and captured by the detector 28 as part of a green light image.

The green source 24*b* is then de-activated and the blue source 24*c* is activated for 250ì s at time "t+500ì s". The blue source 24*c* radiates blue light 60*e* causing emission 60*f* from the media item 20. The emission 60*f* is focused by lens 26 and captured by the detector 28 as part of a blue light image.

The blue source 24*c* is then de-activated and the UV source 24*d* is activated for 250ì s at time "t+750ì s". The UV source 24*d* radiates UV light 60*g* causing emission 60*h* from the media item 20. The emission 60*h* is focused by lens 26 and captured by the detector 28 as part of a UV light image.

The UV source 24*d* is then de-activated and the IR source 24*e* is activated for 250ì s at time "t+1000ì s". The IR source 24*e* radiates IR radiation 60*i* causing emission 60*j* from the media item 20. The emission 60*j* is focused by lens 26 and captured by the detector 28 as part of an IR radiation image.

The IR source 24*e* is then de-activated and the red light source 24*a* is activated for 250ì s at time "t+1250ì s", and so on, so that the radiation sources 24 are activated and de-activated sequentially until a sufficient time period has elapsed to allow a trailing edge of the media item to exit the examination area 22. In this example the media item 20 typically passes through the examination area 22 in less than approximately half a second; the exact time taken depends on the length of the media item.

The micro-controller 32 then collates the radiation information to produce a radiation image for each radiation source (that is, a red image, a blue image, a green image, a UV image, and an IR image). The micro-controller 32 then analyses the five radiation images using one or more known algorithms to ascertain the type of media item 20 being examined. One known type of algorithm uses a generic linear cross-correlation with generic rules, for example, the best match is selected if the best match is better than a predefined percentage, and not within two-sigma of the next best match.

Once the media type has been determined, the micro-controller 32 then authenticates the media type by accessing one or more known tests for that media type, and analysing the appropriate one or more of the five radiation images using the one or more known tests. The known tests are stored in a memory within the micro-controller 32.

If the media item 20 is authenticated then the ATM acts appropriately. For example, if the media item is a banknote having a value of twenty pounds then that amount of money is credited to the user's bank account, and the banknote is conveyed through the capture port 18 to the cash receptacle 138 via the transport device 136. If the media item is a cheque, then the ATM may credit the value of the cheque to the user's account or cash the cheque by dispensing the value of the cheque (minus any commission or fees) to the user 112; in either event, the cheque is conveyed to the non-cash receptacle 140.

If the media item 20 is not authenticated, then the ATM 100 may return the media item 20 to the user 112 via the entrance port 16 and common deposit slot 126. However, if the media item 20 is a suspect item, for example a suspected forgery, then the ATM 100 may capture the media item 20 rather than return it to the user.

EXAMPLE B

Unknown Media Type, Double Scan

An alternative non-media-specific illumination scheme involves the module 10 illuminating the media item 20 with only white light. Furthermore, the micro-controller 32 conveys the media item 20 relatively quickly through the examination area. Thus, the red, green, and blue sources 24*a,b,c* are continuously activated while the media item 20 is conveyed through the examination area 22. The media item 20 may be conveyed at 100 $cms^{-1}$, or any other convenient speed.

The micro-controller 32 then collates the radiation information to produce a single white light radiation image. The micro-controller 32 then analyses the white light radiation image using known algorithms (such as a generic linear cross-correlation with generic rules) to ascertain what type of media item 20 is present.

Once the media type has been ascertained, the micro-controller 32 accesses one or more known tests for that media type, reverses the transport of the media item 20, and activates only those radiation sources 24 required to perform the one or more tests for that media type. The radiation sources may be activated while the media item is being transported in a forward direction (that is, towards capture port 18), or a reverse direction (that is, towards entrance port 16). The tests will typically require the media item to be conveyed at a slower speed, for example, 50 $cms^{-1}$. The micro-controller 32 collates the radiation image or images produced by activating these sources, and then authenticates the known media type by analysing the radiation image or images using the one or more known tests.

EXAMPLE C

Known Media Type Banknote

If the type of media item 20 is known, for example, if the user 112 selects a deposit cash option using the ATM's user interface 114, then a media-specific illumination scheme is implemented relating to a banknote.

The micro-controller 32 implements a media-specific illumination scheme appropriate for the media item being deposited. Such schemes may differ depending on the currency and/or denomination being deposited. In this example the banknote requires illumination by each of the sources and a similar illumination sequence occurs as for Example A above, that is, each of the five radiation sources are illuminated sequentially for 250ì s and the banknote is conveyed at 50 $cms^{-1}$.

The micro-controller 32 then validates the banknote, and if validation is successfully then the banknote is conveyed to the cash receptacle 138 and the value of the banknote is credited to the user's account. If the banknote is not validated then it may be either captured as a suspected forgery or returned to the user 112.

EXAMPLE D

Known Media Type Cheque

If the user 112 selects a deposit cheque option using the ATM's user interface 114, then a media-specific illumination scheme is implemented relating to a cheque.

In this example the cheque requires illumination by the UV light source 24*d* to highlight fields of the cheque and illumination by white light to capture an image for performing optical character recognition (OCR) to recognise text and/or numerals written and/or printed on the fields. The cheque is conveyed slowly (for example, at 40 $cms^{-1}$) so that a high resolution image is obtained for performing accurate OCR. In this example, the UV source and the white light source (three colour sources 24*a,b,c*) are activated continuously (not sequentially).

The micro-controller 32 then validates the cheque using OCR, and if validation is successfully then the cheque is conveyed to the non-cash receptacle 140 and the value of the cheque is credited to the user's account. If the cheque is not validated then it may be returned to the user 112 or captured for subsequent manual processing at a bank or clearing house.

EXAMPLE E

Known Media Type, Ticket

If the user 112 selects a deposit ticket option using the ATM's user interface 114, then a media-specific illumination scheme is implemented relating to a ticket.

In this example the ticket requires illumination by the IR light source 24*e* to detect security features in the ticket, and illumination by white light to capture an image for performing optical character recognition (OCR) to recognise text and/or numerals printed on the ticket. The cheque is conveyed slowly (for example, at 40 $cms^{-1}$) so that a high resolution image is obtained for performing accurate OCR. In this example, the IR source 24*e* and the white light source (24*a,b,c*) are activated sequentially, so that the IR source 24*e* and white light source are activated alternately.

The micro-controller 32 then validates the ticket using OCR, and if validation is successfully then the ticket is conveyed to the non-cash receptacle 140 and acted on by the ATM 100. In examples where the ticket is an airline ticket, the user 112 may be issued a boarding pass by the ATM 100 when the ticket has been validated. If the ticket is not validated then it may be returned to the user 112 or captured by the ATM 100.

Various modifications may be made to the above described embodiments within the scope of the present invention, for example, the self-service terminal may be a non-cash kiosk, or some other form of public access terminal. Self-service terminals are generally public-access devices that are designed to allow a user to conduct a transaction or to access information in an unassisted manner and/or in an unattended environment. SSTs typically include some form of tamper resistance so that they are inherently resilient. SSTs allow users to obtain information and/or to conduct a transaction. SSTs include: ATMs; non-cash kiosks that allow users to access information (for example, to view reward points on a reward card the user inserts into the SST); and kiosks that accept payment for services (for example, Web surfing kiosks, kiosks that allow users to buy goods, etc). The term SST has a relatively broad meaning and includes vending machines.

In other embodiments, an SST may include only the illumination means 24, an optical lens 26, and detecting means 28 at an examination area; so that a processor in the SST performs the function of the micro-controller 32.

It will be appreciated that ticket validation may be performed by an SST that is not an ATM, for example, a non-cash kiosk.

In other embodiments, a CIS detector having a resolution higher than 200 dpi may be used, for example, a 600 dpi CIS detector may be advantageous for accurate OCR imaging.

In other embodiments, a detector other than a CIS detector may be used.

In other embodiments, the module or SST may include a MICR (magnetic ink character recognition) reader to read a MICR line on a cheque.

In other embodiments, the module or SST may include a bar code reader to read a bar code on a media item.

In other embodiments, the module or SST may include a wireless tag reader, such as an RFID tag reader, for reading RFID devices incorporated into media items.

In other embodiments, the module may include a second illumination means located on an opposite side of the examination area to the first illumination means. The second illumination means may be used to irradiate a media item so that transmitted light may be detected by the detecting means.

In other embodiments, the module may include a print head for endorsing any cheques or printing on any tickets inserted into the module.

In other embodiments, a greater or fewer number of sources may be activated than those described in the above examples. For example, some media items may require illumination by UV light alone; other media items may require illumination by red light alone; other media items may require illumination by blue light and IR.

In other embodiments different media items may be validated than those described, for example, birth certificates, driver licences, marriage certificates, share certificates, and such like.

In other embodiments, the module may include a magnetic imaging device to produce another image of a media item.

What is claimed is:

1. A method of processing multiple different types of deposited media items utilizing a single validation module, the method comprising the steps of:

receiving a media item;

ascertaining if the media item is of a known type;

if the media item is of a known type, applying a media-specific illumination combination to the media item, where the media-specific illumination combination is selected from one or more illumination sources including an ultra-violet source, an infra-red source and a visible light source emanating primary colors, wherein the media-specific illumination combination is selected and activated based on the media type;

if the media item is not of a known type, applying a non-media-specific illumination combination to the media item;

detecting emissions from the media item, where the emissions are caused by the activated illumination sources;

collating the detected emissions according to the type of source used;

processing the collated emissions to determine if the media item is valid; and if the media item is determined to be valid, conveying the media item to a receptacle.

2. A method according to claim 1, wherein, in the event of the non-media-specific illumination combination being used, the step of processing the collated emissions to determine if the media item is valid includes the sub-steps of (i) identifying the type of media item, and (ii) then authenticating the identified media item.

3. A self-service terminal comprising:

a single module for receiving multiple different types of deposited media items for validation, the single module comprising:

means for ascertaining if the deposited media item is of a known type;

means for applying a media-specific illumination combination to the deposited media item if the media item is of a known type, wherein the media-specific illumination combination is selected from one or more illumination sources including an ultra-violet source, an infra-red source and a visible light source emanating primary colors, wherein the media-specific illumination combination is selected and activated based on the media type;

means for applying a non-media-specific illumination combination to the deposited media item if the media item is not of a known type;

means for detecting emissions from the deposited media item, wherein the emissions are caused by activated illumination sources;

means for collating the detected emissions according to the type of source used; and means for processing the collated emissions to validate the deposited media item.

4. A self-service terminal according to claim 3, wherein the processing means includes means for identifying the type of media item, and means for authenticating the identified media item when the non-media-specific illumination combination is used.

* * * * *